Patented Mar. 17, 1925.

1,529,946

UNITED STATES PATENT OFFICE.

HARRY E. DUBIN AND LOUIS FREEDMAN, OF NEW YORK, N. Y., ASSIGNORS TO HERMAN A. METZ, OF NEW YORK, N. Y.

PROCESS FOR THE PREPARATION OF FATTY ACIDS OF THE ACETIC-ACID SERIES FROM THEIR HIGHER HOMOLOGUES.

No Drawing.   Application filed June 5, 1924.   Serial No. 718,075.

*To all whom it may concern:*

Be it known that we, HARRY E. DUBIN and LOUIS FREEDMAN, both citizens of the United States, both residing at New York, in the county of New York and State of New York, have invented certain new and useful Improvements in Processes for the Preparation of Fatty Acids of the Acetic-Acid Series from Their Higher Homologues, of which the following is a specification.

This invention relates to a process for the preparation of fatty acids of the acetic acid series ($C_nH_{2n}O_2$) from acids of the same series but of higher molecular weight. A unit procedure of the process in accordance with our invention consists generally in converting an acid of the acetic acid series to the corresponding halogen acid, treating the halogen acid with an alkaline reagent capable of replacing the halogen by a hydroxyl group, oxidizing the hydrolized product of the alkaline treatment and recovering the resulting acid. Each unit procedure serves to produce an acid containing one less carbon atom than the acid treated so that, as will be apparent, the complete process which may comprise any desired multiple of the unit procedure may serve to produce an acid containing any desired number of carbon atoms from an acid containing a greater number of carbon atoms. The process may be regarded as an improvement upon prior processes described by Le Sueur in the Transactions of the Chemical Society 85, page 827, of 1904 and by Levene and West in the Journal of Biological Chemistry 16, page 475, of 1914, and for convenience will be described in connection with the preparation of margaric acid from stearic acid.

According to the process described by Le Sueur margaric acid is prepared from stearic acid by converting the stearic acid to alpha-brom stearic acid in the well known way, converting the alpha-brom stearic acid to alpha hydroxy stearic acid by the action of a dilute aqueous solution of potassium hydroxide at 100° C., separating and drying the alpha hydroxy stearic acid and converting it to margaric aldehyde by heating to 270° C., and oxidizing the margaric aldehyde to margaric acid by means of permanganate. The process described by Levene and West shortened the Le Sueur process somewhat by transforming the alpha hydroxy stearic acid directly to the alkali metal salt of margaric acid by oxidation with permanganate, preferably in acetone solution, that is, the Levene and West process eliminates the formation and isolation of margaric aldehyde of the Le Sueur process.

In the process of our invention the transformation from the alpha-brom stearic acid to the alkali metal salt of margaric acid is accomplished in a single step, thus eliminating two steps of the Le Sueur process, to wit, the formation and separation of the alpha hydroxy stearic acid and its conversion to the margaric aldehyde, or one step of the Levene and West process, to wit, the formation and isolation of the alpha hydroxy stearic acid.

The principal reactions involved in the process are indicated by the following general equation in which for convenience bromine represents any halogen, KOH represents any alkaline agent capable of replacing the halogen by a hydroxyl group, $KMnO_4$ represents any suitable oxidizing agent and R represents an alkyl group:

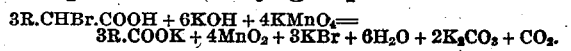
$3R.CHBr.COOH + 6KOH + 4KMnO_4 =$
$3R.COOK + 4MnO_2 + 3KBr + 6H_2O + 2K_2CO_3 + CO_2$.

The following specific procedure illustrates our invention:

One molecular equivalent of alpha-brom stearic acid is dissolved in a hot aqueous solution of about two molecular equivalents of potassium hydroxide. The potassium hydroxide solution should be sufficiently dilute to give about a 2½% solution of the potassium salt of the alpha brom stearic acid. To the solution so prepared there is added gradually over a period of 30 to 60 minutes with good agitation a dilute aqueous solution of 1⅓ molecular equivalents of potassium permanganate. The resulting solution is maintained at a temperature of say 90–100° C. for a period of 3 to 4 hours, that is, until the action of the permanganate is complete. The solution now contains potassium margarate from which the margaric acid may be obtained directly by acidification. The yield by this method is uniformly about 95% of the theoretical yield, the yield claimed for the Levene and West process being 80–85%, and besides being much quicker and less expensive than the Le Sueur and Levene and West processes, possesses certain other advantages thereover. For instance, in the Levene and West process the potassium margarate formed in the acetone solution settles out in solid form and must be separated by filtration, dried, extracted with alcohol, allowed to crystallize from the alcohol, dissolved in water, and finally acidified to produce the margaric acid.

The principal reactions involved in the process of the foregoing example are illustrated by the following equation:

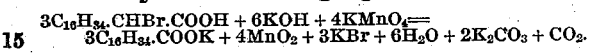

The specific procedure described above is capable of considerable variation. The potassium hydroxide solution is used hot, say 65° C. or higher, merely to facilitate the solution of the alpha-brom stearic acid and it need be only sufficiently hot to accomplish this result. The concentration of the potassium hydroxide solution also may vary, it being essential only that it shall comprise sufficient water to dissolve the potassium salt. In place of the potassium hydroxide other alkalies capable of splitting off the bromine atom, for instance sodium hydroxide may be used but potassium hydroxide is preferred because it gives a more soluble soap. The reaction mixture resulting from the addition of permanganate may be heated at temperatures other than, either below or above, 90°–100° C. The permanganate solution may be added to the potassium alpha brom stearate more rapidly or more slowly than as described, but for the best results it must be added slowly and in small amounts. The heating of the reaction mixture, resulting from the addition of the permanganate may be for a longer or shorter period than 3–4 hours, depending upon the rate of reaction. In place of the permanganate other oxidizing agents such as sodium peroxide, capable of acting in an alkaline medium may be used. The quantity of permanganate used may even be varied. Regarding the use of the quantity of alkaline reagent specified in the example, to wit, two molecular equivalents of potassium hydroxide to each molecular equivalent of alpha brom acid, it is noted that this specific ratio with only slight variations gives the best results, although it is possible to operate with substantially greater or less proportions of the alkaline reagent. The process, as is indicated above, is not limited to the conversion of stearic acid to margaric acid, but may serve for the conversion of other fatty acids of the acetic acid series to other acids of the same series but containing a smaller number of carbon atoms. It is of course understood that the process is not necessarily started with an acid or finished with an acid having a less number of carbon atoms in its molecule. The alpha brom fatty acid may be regarded as the starting material, since the formation of alpha brom acids from the corresponding fatty acids of the acetic acid series is a known expedient and the alkali metal salt of the acid having a less number of carbon atoms may be regarded as the final product, since its conversion to the acid is a known step.

We claim:

1. Process for the preparation of fatty acids of the acetic acid series from their higher homologues, which comprises mixing an alpha halogen derivative of a fatty acid of the acetic acid series having a greater number of carbon atoms in its molecule than the acid desired with an alkaline reagent capable of replacing the halogen by a hydroxyl group, and treating the mixture with an oxidizing agent.

2. Process for the preparation of fatty acids of the acetic acid series from their higher homologues, which comprises mixing an alpha halogen derivative of a fatty acid of the acetic acid series having a greater number of carbon atoms in its molecule than the acid desired with a dilute aqueous solution of an alkali metal hydroxide, and treating the mixture with an oxidizing agent.

3. Process for the preparation of fatty acids of the acetic acid series from their higher homologues, which comprises reacting upon one molecular proportion of the alpha brom derivative of a fatty acid of the acetic acid series having a greater number of carbon atoms in its molecule than the acid desired with two molecular proportions of an alkali metal hydroxide, and then treating the reaction mixture with a permanganate.

4. Process for the preparation of fatty acids of the acetic acid series from their higher homologues, which comprises dissolving one molecular proportion of the alpha brom derivative of a fatty acid of the acetic acid series containing a greater number of carbon atoms in its molecule than the acid desired in a dilute aqueous solution containing two molecular proportions of an alkali metal hydroxide and treating the solution so prepared with a permanganate.

5. Process for the preparation of fatty acids of the acetic acid series from their higher homologues, which comprises dissolving one molecular equivalent of the alpha brom derivative of a fatty acid of the acetic acid series containing a greater number of carbon atoms in its molecule than the acid desired in a hot aqueous solution of two molecular equivalents of an alkali metal hydroxide, said solution containing water in quantity sufficient to form an approximately 2½% solution of the alkali metal salt of said alpha brom derivative, adding to the solution so prepared a dilute aqueous solution containing about 1⅓ molecular proportions of a permanganate, and heating the resulting solution.

6. Process for the preparation of margaric acid from stearic acid, which comprises dissolving one molecular equivalent of alpha brom stearic acid in a hot aqueous solution of two molecular equivalents of potassium hydroxide comprising sufficient water to give an approximately 2½% solution of the potassium salt of alpha brom stearic acid formed, gradually adding to the solution so prepared over a period of 30–60 minutes with good agitation a dilute solution containing 1⅓ molecular proportions of potassium permanganate, and heating the resulting solution at a temperature of 90–100° C. for from 3 to 4 hours.

In testimony whereof, we affix our signatures.

HARRY E. DUBIN.
LOUIS FREEDMAN.